United States Patent
Nias et al.

(10) Patent No.: US 10,157,635 B2
(45) Date of Patent: Dec. 18, 2018

(54) STEPPED ASSEMBLY

(71) Applicant: SAINT-GOBAIN PERFORMANCE PLASTICS RENCOL LIMITED, Coventry (GB)

(72) Inventors: Benjamin Nias, Bristol (GB); Andrew R. Slayne, Bristol (GB); Simon A. Hughes, Bristol (GB); Robert Winter, Longmont, CO (US)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 409 days.

(21) Appl. No.: 14/796,337

(22) Filed: Jul. 10, 2015

(65) Prior Publication Data

US 2016/0012836 A1    Jan. 14, 2016

Related U.S. Application Data

(60) Provisional application No. 62/023,595, filed on Jul. 11, 2014.

(51) Int. Cl.
*G11B 5/48*    (2006.01)
*F16C 11/04*   (2006.01)
(Continued)

(52) U.S. Cl.
CPC ............ *G11B 5/4813* (2013.01); *F16C 11/04* (2013.01); *F16D 1/0835* (2013.01); *F16D 7/021* (2013.01)

(58) Field of Classification Search
CPC ....... G11B 5/48; G11B 5/4813; G11B 5/4806; G11B 5/4826; G11B 5/4833; G11B 5/50;
(Continued)

(56) References Cited

U.S. PATENT DOCUMENTS 1,936,213 A    11/1933   Snedden
3,007,726 A *  11/1961   Parkin .................. F16B 21/205
                                                      135/77
(Continued)

FOREIGN PATENT DOCUMENTS

CH           151751 A       12/1931
CN           1774580 A       5/2006
(Continued)

OTHER PUBLICATIONS

International Search Report for PCT/IB2009/005586, dated Dec. 22, 2009, 2 pages.
(Continued)

*Primary Examiner* — Michael P Ferguson
(74) *Attorney, Agent, or Firm* — Abel Law Group, LLP; Chi Suk Kim

(57) ABSTRACT

A tolerance ring can be disposed between an inner component and an outer component, the inner and outer components defining stepped sidewalls. In an embodiment, a preassembly can include an outer component defining a bore having a stepped inner sidewall, an inner component having a stepped outer sidewall, and a tolerance ring adapted to be disposed between the inner component and the bore. In an embodiment, an assembly can include an outer component defining a bore having a stepped inner sidewall, an inner component having a stepped outer sidewall, and a tolerance ring disposed between the inner component and the bore. In an embodiment, a hard disk drive preassembly can include an actuator arm defining a bore having a stepped inner sidewall, a pivot having a stepped outer sidewall, and a tolerance ring adapted to be disposed between the pivot and the bore.

9 Claims, 5 Drawing Sheets

(51) Int. Cl.
*F16D 1/08* (2006.01)
*F16D 7/02* (2006.01)

(58) Field of Classification Search
CPC ....... G11B 5/53; F16D 1/0805; F16D 1/0835; Y10T 403/7061; Y10T 403/7047; Y10T 403/7058; Y10T 403/7052; Y10T 403/7049; Y10T 403/7051
See application file for complete search history.

(56) References Cited

U.S. PATENT DOCUMENTS

| | | | |
|---|---|---|---|
| 3,142,887 | A | 8/1964 | Hulck et al. |
| 3,700,271 | A | 10/1972 | Blaurock et al. |
| 3,776,653 | A | 4/1973 | Buzogany |
| 3,838,928 | A | 10/1974 | Blaurock et al. |
| 3,962,843 | A | 6/1976 | King, Jr. |
| 4,286,894 | A | 9/1981 | Rongley |
| 4,790,683 | A | 12/1988 | Cramer, Jr. et al. |
| 4,801,230 | A * | 1/1989 | Wilburn ............... F16B 5/02 411/177 |
| 4,828,423 | A | 5/1989 | Cramer, Jr. et al. |
| 4,981,390 | A | 1/1991 | Cramer, Jr. et al. |
| 5,607,023 | A | 3/1997 | Palm |
| 6,018,441 | A * | 1/2000 | Wu ..................... G11B 5/5521 360/265.6 |
| 6,288,878 | B1 | 9/2001 | Misso et al. |
| 6,333,839 | B1 | 12/2001 | Misso et al. |
| 6,361,261 | B1 * | 3/2002 | Gattone ............... F16B 21/18 411/520 |
| 6,480,363 | B1 | 11/2002 | Prater |
| 6,606,224 | B2 | 8/2003 | McPherson et al. |
| 6,755,746 | B2 | 6/2004 | Barnley et al. |
| 7,118,181 | B2 * | 10/2006 | Frear .................... E21C 35/197 299/104 |
| 7,554,771 | B2 | 6/2009 | Hanrahan et al. |
| 7,580,225 | B2 | 8/2009 | Hanrahan et al. |
| 7,611,303 | B2 | 11/2009 | Hanrahan et al. |
| 7,658,677 | B2 | 2/2010 | Needes et al. |
| 7,850,389 | B2 * | 12/2010 | Hanrahan ............. F16C 27/00 360/265.6 |
| 7,913,835 | B2 | 3/2011 | Gautier et al. |
| 7,922,418 | B2 * | 4/2011 | Baker .................. F16C 11/04 360/265.2 |
| 8,385,024 | B2 * | 2/2013 | Schmidt ............... G11B 5/4813 360/265.6 |
| 8,424,184 | B2 | 4/2013 | Hughes |
| 8,485,752 | B2 * | 7/2013 | Slayne .................. F16C 23/04 360/265.2 |
| 2003/0053260 | A1 | 3/2003 | Barina et al. |
| 2006/0046858 | A1 | 3/2006 | Brisette |
| 2006/0181811 | A1 * | 8/2006 | Hanrahan ............. F16C 27/00 360/265.2 |
| 2006/0228174 | A1 | 10/2006 | Woodhead et al. |
| 2006/0275076 | A1 | 12/2006 | Hanrahan et al. |
| 2006/0276246 | A1 | 12/2006 | Needes et al. |
| 2008/0043375 | A1 | 2/2008 | Hanrahan et al. |
| 2008/0199254 | A1 | 8/2008 | Baker et al. |
| 2008/0266717 | A1 | 10/2008 | Court et al. |
| 2008/0267693 | A1 | 10/2008 | Court et al. |
| 2009/0285627 | A1 | 11/2009 | Slayne |
| 2010/0003076 | A1 | 1/2010 | Slayne |
| 2010/0321832 | A1 | 12/2010 | Woodhead et al. |
| 2010/0321833 | A1 | 12/2010 | Woodhead et al. |
| 2011/0076096 | A1 | 3/2011 | Slayne et al. |
| 2011/0271512 | A1 | 11/2011 | Hughes |
| 2013/0276289 | A1 | 10/2013 | Slayne |

FOREIGN PATENT DOCUMENTS

| | | |
|---|---|---|
| CN | 101122304 A | 2/2008 |
| CN | 102016337 A | 4/2011 |
| DE | 3248148 A1 | 7/1984 |
| EP | 0522717 A2 | 1/1993 |
| EP | 1568554 A1 | 8/2005 |
| EP | 1693635 A1 | 8/2006 |
| EP | 1731783 A2 | 12/2006 |
| EP | 1886895 A1 | 2/2008 |
| JP | 2002087924 A | 3/2002 |
| JP | 2002130310 A | 5/2002 |
| JP | 2004092828 A | 3/2004 |
| JP | 2006095120 A | 4/2006 |
| JP | 2006342967 A | 12/2006 |
| JP | 2008095950 A | 4/2008 |
| WO | 9429609 A1 | 12/1994 |
| WO | 2004094852 A1 | 11/2004 |
| WO | 2009138862 A2 | 11/2009 |

OTHER PUBLICATIONS

International Search Report for PCT/IB2015/001638, dated Jan. 22, 2016, 2 pages.

* cited by examiner

STEPPED ASSEMBLY

CROSS-REFERENCE TO RELATED APPLICATION(S)

This application claims priority under 35 U.S.C. § 119(e) to U.S. Patent Application No. 62/023,595 entitled "STEPPED ASSEMBLY," by Benjamin Nias, et al., filed Jul. 11, 2014, which is assigned to the current assignee hereof and incorporated herein by reference in its entirety.

FIELD OF THE DISCLOSURE

The present disclosure relates to assemblies, and more particularly to hard disk drive assemblies.

RELATED ART

Problems can occur during assembly of parts that use tolerance rings, e.g., hard disk drives. For example, there may be abrasion between the tolerance ring and various parts of the apparatus, which removes small fragments from the surface of the effected parts. These fragments are known in the art as particles. In particular, radially outermost parts of the projections of the tolerance ring may generate particles when sliding relative to part(s) of the apparatus. In certain apparatus, such as in hard disk drives where cleanliness is essential, production of particles is undesirable, as the particles can adversely affect the function of the apparatus.

Another problem associated with the use of tolerance rings is known as "torque ripple" where the torque in the apparatus is not generated at a continuous level, potentially causing axial misalignment between the parts of the apparatus. Torque ripple can be caused during assembly of the apparatus, e.g., by forces exhibited during press fitting of the components. Particularly in hard disk drives where high speed rotation is necessary, axial misalignment may lead to particle generation or premature failure.

There continues to exist a need for an assembly that can minimize particle generation and torque ripple in apparatuses, e.g., hard disk drives.

BRIEF DESCRIPTION OF THE DRAWINGS

Embodiments are illustrated by way of example and are not limited in the accompanying figures.

Figure 1:
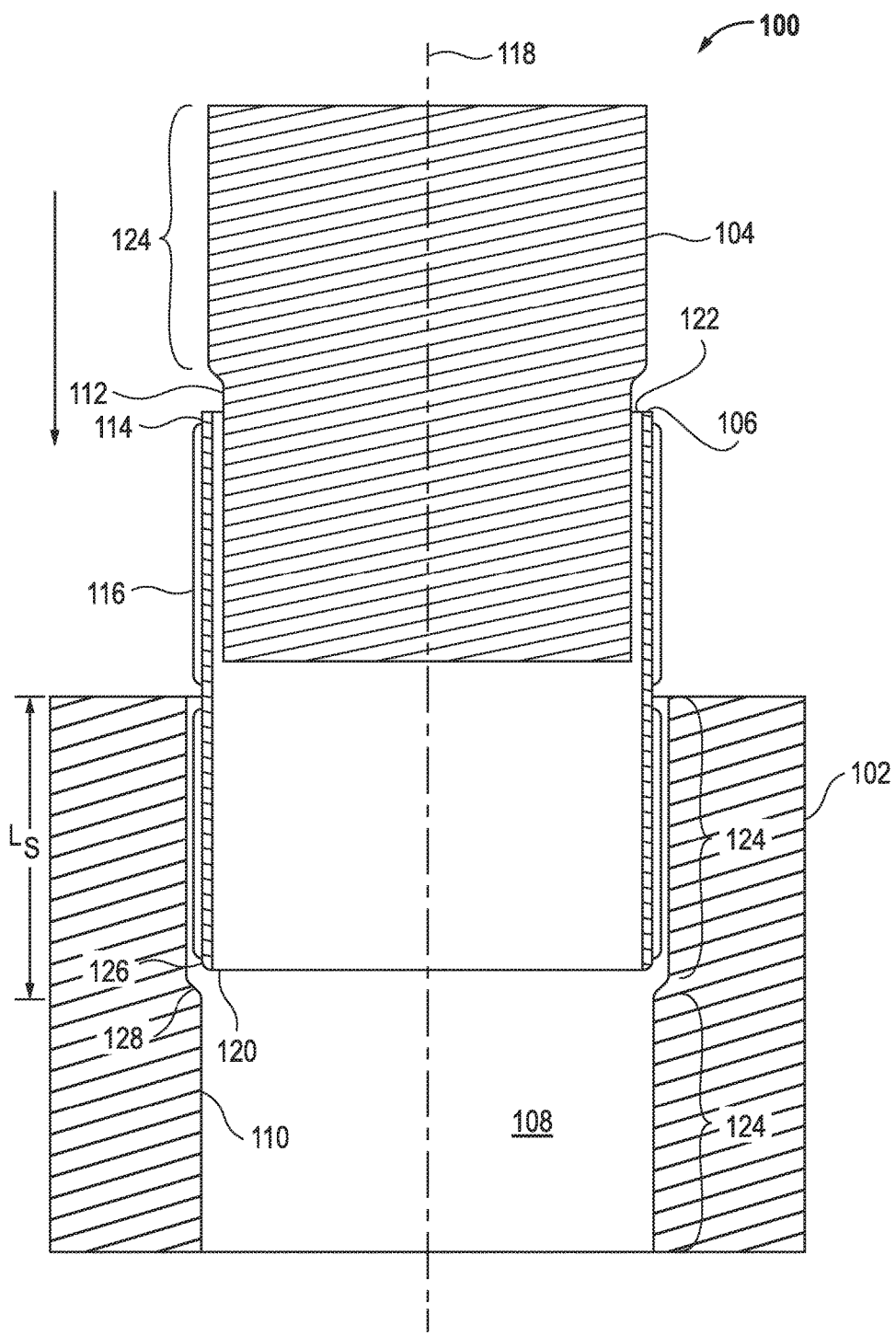
FIG. 1 includes a cross-sectional side view of a preassembly in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the tolerance ring and hard disk drive arts.

A preassembly in accordance with one or more of the embodiments described herein can generally include an outer component defining a bore having a stepped inner sidewall, an inner component having a stepped outer sidewall, and a tolerance ring adapted to be disposed between the inner component and the bore. In particular embodiments, the stepped inner sidewall can have a number of steps equal to a number of steps of the stepped outer sidewall.

An assembly in accordance with one or more of the embodiments described herein can include an outer component defining a bore having a stepped inner sidewall, an inner component having a stepped outer sidewall, and a tolerance ring disposed between the inner component and the bore. In particular embodiments, the stepped inner sidewall can have a number of steps equal to the stepped outer sidewall.

Referring now to the figures, FIG. 1 illustrates a preassembly 100 in accordance with one or more of the embodiments described herein. The preassembly 100 can generally include an outer component 102, an inner component 104, and a tolerance ring 106. The outer component 102 can define a bore 108 having a stepped inner sidewall 110. The inner component can define a stepped outer sidewall 112. The tolerance ring 106 can include an annular sidewall 114 having a plurality of radially extending projections 116.

In a particular embodiment, at least one of the inner and outer components 104 and 102 can be rigid. As used herein, "rigid" refers to a resistance to perceptible deformation, e.g., a measured dimension of a component will change by no greater than 10%, such as no greater than 5%, or even no greater than 1% upon application of a force of at least 10 N, such as at least 50 N, or even at least 100 N. In such a manner, the inner or outer component 104 or 102 can be adapted to be significantly undeformed (e.g., deformed by less than 10%, such as less than 5%, or even less than 1%) during assembly. In a more particular embodiment, both the inner and outer components 104 and 102 can be rigid. In an embodiment, rigidity of one or both of the inner and outer components 104 and 102 can reduce particle generation and increase assembled concentricity.

In a particular embodiment, the radially extending projections 116 can be deformable in a radial direction. For example, in a more particular embodiment, the radially extending projections 116 can be adapted to operate in an elastic zone of deformation. As such, the radially extending projections 116 can deform upon a loading condition, e.g., a radial force, and can return, or nearly return, to a pre-deformed state upon removal of the loading condition. In another more particular embodiment, the radially extending projections 116 can be adapted to operate in a plastic zone of deformation. In such a manner, the radially extending projections 116 can deform upon a loading condition, however, unlike elastically deformable projections—such as described above, the radially extending projections 116 may not return to a pre-deformed state upon removal of the loading condition.

Figure 4:
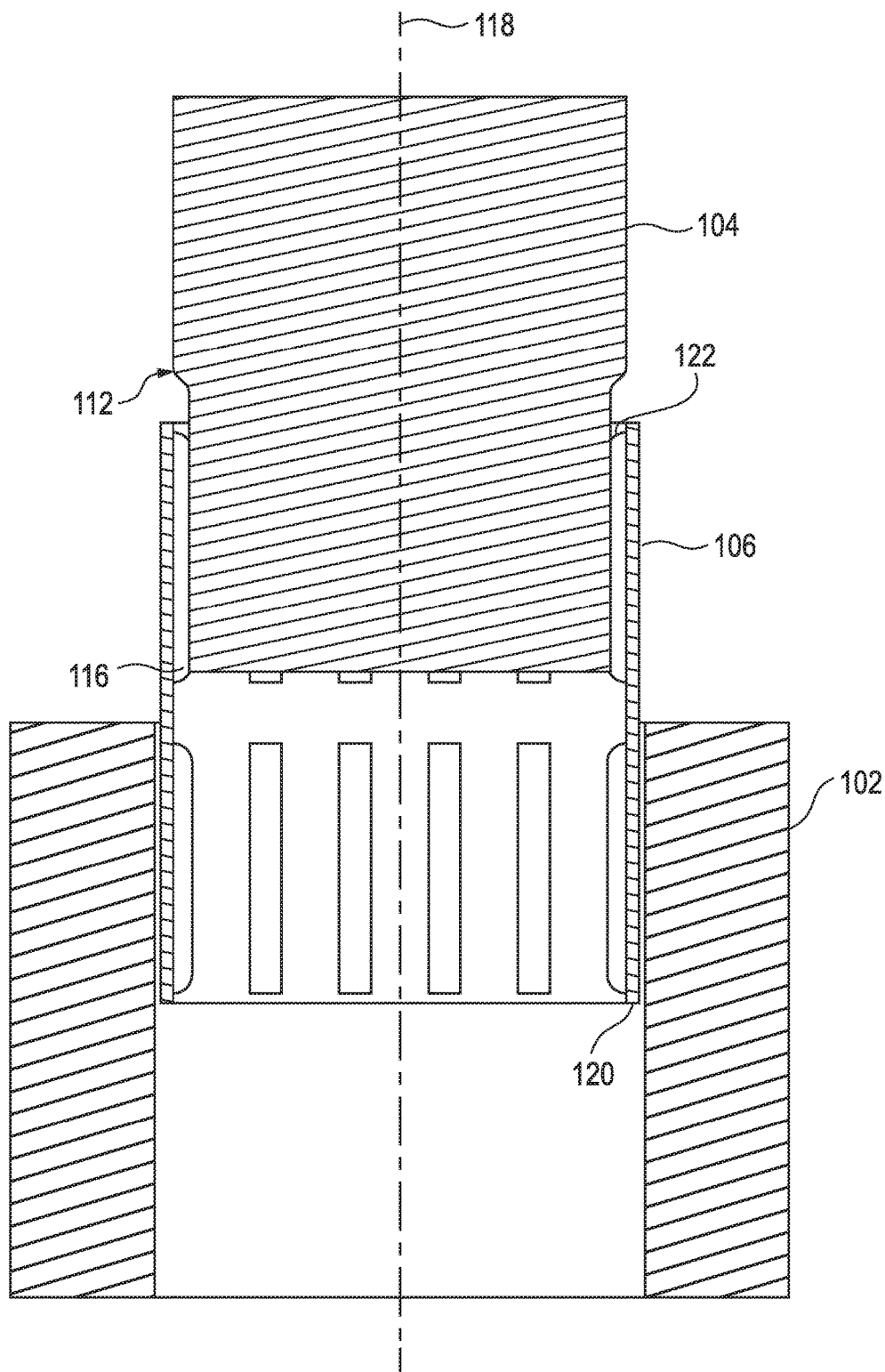
FIG. 4 includes a cross-sectional side view of a preassembly in accordance with an embodiment.

In an embodiment, at least one of the radially extending projections 116 can extend radially outward (e.g., away from a central axis 118). In another embodiment, at least one of the radially extending projections 116 can extend radially inward (e.g., toward the central axis 118 as illustrated in FIG. 4). In a more particular embodiment, all of the radially extending projections 116 can extend in a same direction, e.g., radially inward or radially outward.

In a particular embodiment, at least a portion of the annular sidewall 114 can contact one of the inner and outer components 104 and 102, while at least one of the plurality of radially extending projections 116 contacts the other of the inner and outer components 104 and 102. In a more particular embodiment, all of the annular sidewall 114 can contact one of the inner and outer components 104 and 102 and at least an outermost surface of each radially extending projection 116 can contact the other of the inner and outer components 104 and 102.

Figure 3:
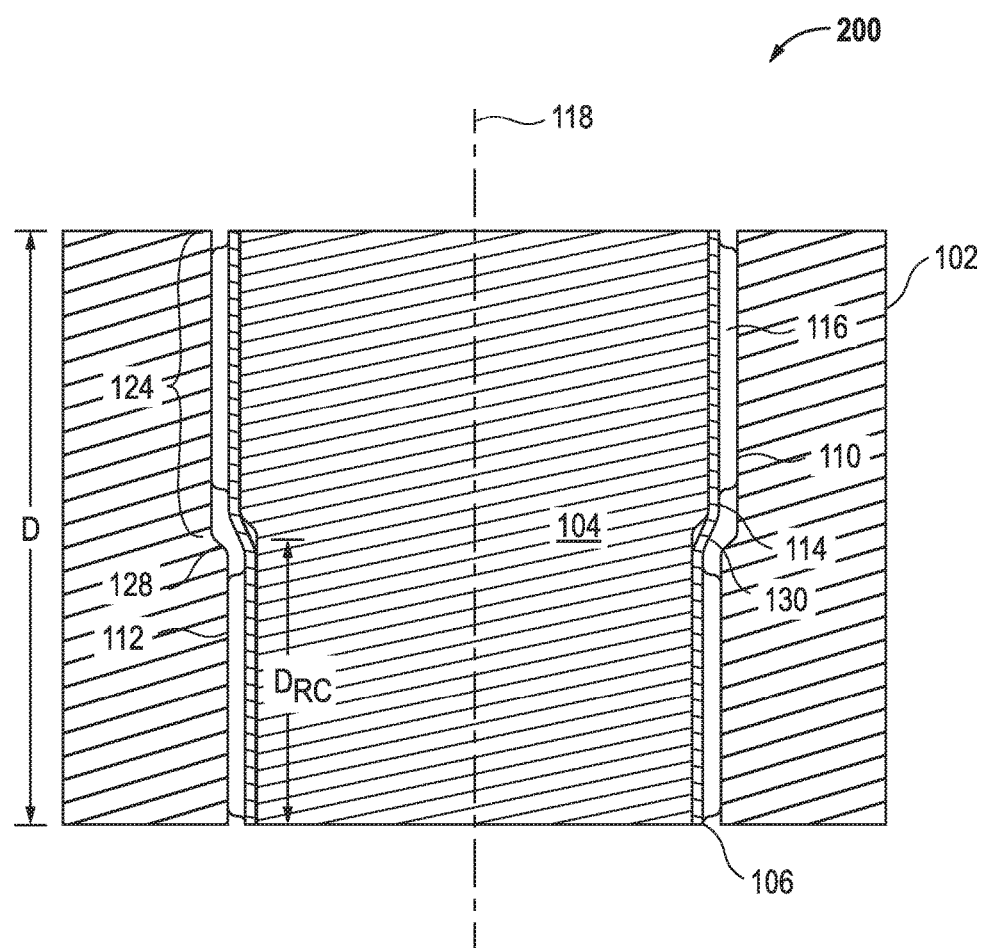
FIG. 3 includes a cross-sectional side view of an assembly in accordance with an embodiment.

In an embodiment, the tolerance ring 106 can further include an undeformed portion 126, e.g., an annular band, extending around at least one axial end 120 or 122 of the tolerance ring 106. In a more particular embodiment, each axial end 120 and 122 can include an undeformed portion 126. The undeformed portion(s) 126 can be devoid of radially extending projections 116. In an embodiment, the undeformed portion(s) can fully contact one of the inner and outer components 104 and 102. This may increase rotational and radial stability of the preassembly 100 in assembled form (FIG. 3). In an embodiment, the undeformed portion 126 may extend around the tolerance ring 106 at both axial ends 120 and 122.

In a particular embodiment, the radially extending projections 116 can be arranged in a number of circumferentially extending rows. In a more particular embodiment, there can be at least 2 circumferentially extending rows, such as at least 3 circumferentially extending rows, at least 4 circumferentially extending rows, or even at least 5 circumferentially extending rows. In yet a more particular embodiment, there can be no greater than 15 circumferentially extending rows, such as no greater than 10 circumferentially extending rows, or even no greater than 5 circumferentially extending rows. As will be described in greater detail, in a particular embodiment the number of circumferentially extending rows can be equal to a number of steps in the stepped inner sidewall 110, the stepped outer sidewall 112, or both.

Each circumferentially extending row can have a perceived radial stiffness, as measured by the combined radial stiffness of all radially extending projections 116 contained within the row. In an embodiment, the perceived radial stiffness can be balanced, e.g., the force provided by all of the radially extending projections 116 can balance one another such that a net radial force is zero. In another embodiment, the perceived radial stiffness of multiple rows of projections can be equal.

In an embodiment, the tolerance ring 106 can further include a circumferential gap (not illustrated) extending at least partially between opposite axial ends 120 and 122 of the tolerance ring 106. In a particular embodiment, the circumferential gap can extend entirely between the axial ends 120 and 122 of the tolerance ring 106.

In a particular embodiment, prior to installation of the inner component, the outer component, and the tolerance ring 104, 102, and 106, the circumferential gap of the tolerance ring 106 can have a uniform width, as measured in a circumferential direction around the tolerance ring 106. After completion of assembly, the circumferential gap can include a width, $W_{G1}$, as measured in a circumferential direction around the tolerance ring 106 at, or adjacent, the axial end 122 of the tolerance ring 106, and a width, $W_{G2}$, as measured in a circumferential direction around the tolerance ring 106 at, or adjacent, the axial end 120 of the tolerance ring 106. In a particular embodiment, $W_{G1}$ can be different than $W_{G2}$. For example, in a non-limiting embodiment, $W_{G1}$ can be no greater than 1.5 $W_{G2}$, such as no greater than 1.4 $W_{G2}$, no greater than 1.3 $W_{G2}$, no greater than 1.2 $W_{G2}$, no greater than 1.1 $W_{G2}$, no greater than 1.05 $W_{G2}$, or even no greater than 1.01 $W_{G2}$. In a further embodiment, $W_{G1}$ can be no less than 1.0001 $W_{G2}$, such as no less than 1.0002 $W_{G2}$, no less than 1.001 $W_{G2}$, or even no less than 1.005 $W_{G2}$.

In another embodiment, prior to installation of the inner component 104, the outer component 102, and the tolerance ring 106, the circumferential gap of the tolerance ring 106 can have a nonuniform width, as measured in a circumferential direction around the circumference of the tolerance ring 106. After completion of assembly, the circumferential gap can have a uniform width, as measured in a circumferential direction around the tolerance ring 106.

Figure 2:
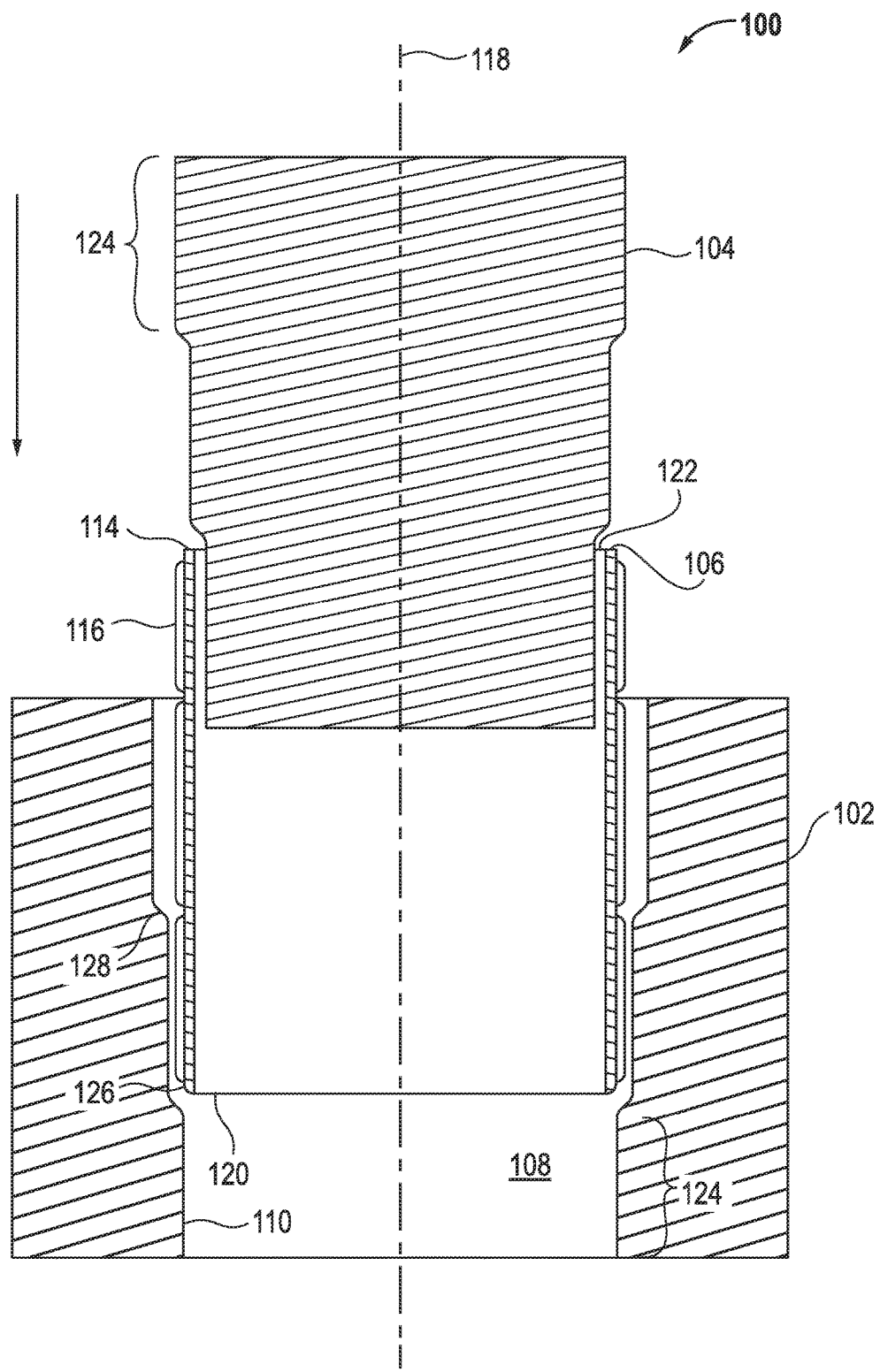
FIG. 2 includes a cross-sectional side view of an alternative preassembly in accordance with an embodiment.

In an embodiment, the inner stepped sidewall 110 of the outer component 102 and the outer stepped sidewall 112 of the inner component 104 can each have a number of steps 124. In a particular embodiment, each of the stepped sidewalls 110 and 112 can include at least 2 steps, such as at least 3 steps (FIG. 2), at least 4 steps, or even at least 5 steps. In another embodiment, each of the stepped sidewalls 110 and 112 can include no greater than 15 steps, such as no greater than 10 steps, or even no greater than 5 steps. In yet a more particular embodiment, the tolerance ring 106 can have a number of circumferentially extending rows of radially extending projections 116 that is equal to the number of steps 124.

In accordance with a particular embodiment, formation of each step 124 can occur successively, e.g., from one axial end of the stepped sidewall 110 or 112 to an opposite axial end of the stepped sidewall 110 or 112. For example, a first step can be formed by removing material to form a portion of the stepped sidewall 110 or 112. The first step can have a first step diameter. A second step adjacent to the first step can then be formed by removing additional material to form a portion of the stepped sidewall 110 or 112. The second step can have a second step diameter that is different from the first step diameter. This process can be repeated to form each additional step to form a stepped sidewall 110 or 112.

In an embodiment, each step 124 can define a cylindrical surface. When viewed in cross section, an inner surface of each step 124 can extend along a line that is parallel, or generally parallel, with the central axis 118. As used herein, "generally parallel" refers to a relative angle between planes or lines of no greater than 5°, such as no greater than 4°, no greater than 3°, no greater than 2°, or even no greater than 1°. As used herein, "parallel" refers to a relative angle between planes or lines of no greater than 0.1°. In such a manner, the diameter of each step 124 can be constant, or relatively constant, along an entire axial length of the step 124.

In another embodiment, a diameter of at least one step can change as measured along an axial length of the step. That is, the step can have a non-uniform diameter. In a more particular embodiment, at least one step can define a generally frustocononical inner surface.

Referring still to FIG. 1, each step 124 can define a diameter, or an average diameter, that is different from an adjacent step 124. For example, the diameter of adjacent steps can differ by at least 0.01 mm, such as at least 0.02 mm, at least 0.03 mm, at least 0.04 mm, at least 0.05 mm, at least 0.06 mm, at least 0.07 mm, at least 0.08 mm, or even at least 0.09 mm. In a particular embodiment, the diameter of adjacent steps 124 can differ by no greater than 10 mm, such as no greater than 5 mm, no greater than 4 mm, no greater than 3 mm, no greater than 2 mm, no greater than 1 mm, no greater than 0.75 mm, no greater than 0.5 mm, no greater than 0.25 mm, or even no greater than 0.1 mm.

In another embodiment, the diameter of adjacent steps can differ by at least 0.1%, such as at least 0.2%, at least 0.3%, at least 0.4%, or even at least 0.5. Moreover, the diameter of adjacent steps can differ by no greater than 10%, such as no greater than 8%, no greater than 5%, or even no greater than 1%.

In an embodiment, a transition zone 128 disposed between adjacent steps 124 can be smooth, or generally smooth. After reading the entire specification, a skilled artisan will understand that surface roughness, such as caused during the normal manufacturing of the transition zone 128, constitutes "generally smooth." As used herein, "smooth" refers to an enhanced surface finish, for example, polished, buffed, etc. A smooth, or generally smooth, transition zone 128 can help facilitate installation of the tolerance ring 106.

A diameter of the transition zone 128 can change in a linear or nonlinear manner. For example, in an embodiment, when viewed in cross section, the transition zone 128 can extend between adjacent steps 124 along a straight line. Alternatively, as illustrated in FIG. 1, the transition zone 128 can have a partially, or fully, arcuate profile. A curved, or partially curved, profile may reduce particle generation during assembly. Moreover, a curved, or partially curved, profile may more evenly radiate forces within the transition zone 128 and prevent the formation of stress concentration at or along a single location of the transition zone 128 where contact between the tolerance ring 106 and the transition zone 128 occurs.

In a particular embodiment, each step can define an axial length, $L_S$, as measured between opposite axial ends of the step 124 in a direction parallel with the central axis 118.

In an embodiment, the tolerance ring 106 can be installed at least partially around the inner component 104 prior to insertion of the inner component 104 into the outer component 102. In another embodiment, the tolerance ring 106 can be installed at least partially within the outer component 104 prior to insertion of the inner component 104 into the outer component 102. As used herein, "installed at least partially" refers to a condition where at least 1% of the tolerance ring 106, as measured in an axial direction, is engaged with one of the inner or outer components 104 or 102 prior to engagement with the other of the inner or outer components 104 or 102. In an embodiment, "installed at least partially" may refer to a condition where at least 2%, at least 3%, at least 4%, at least 5%, at least 10%, or even at least 25% of the tolerance ring 106, as measured in an axial direction, is engaged with one of the inner or outer components 104 or 102 prior to engagement with the other of the inner or outer components 104 or 102.

During assembly the inner and outer components 104 and 102 can be urged together along the central axis 118. After completion of assembly, the tolerance ring 106 can be radially disposed between the inner and outer components 104 and 102.

FIG. 3 illustrates an assembly 200 including the outer component 102, the inner component 102, and a tolerance ring 106 disposed between the inner and outer components 104 and 102.

In the assembled state, the annular sidewall 114 of the tolerance ring 106 can define a deformed, or bent, portion 130 disposed at a location between adjacent steps 124. More particularly, the annular sidewall 114 can define a deformed, or bent, portion 130 at a location adjacent to a transition zone 128 disposed between adjacent steps 124. A skilled artisan will recognize that the deformed portion 130 of the tolerance ring illustrated in FIG. 3 is exaggerated for clarity. Specifically, because a difference between the diameters of adjacent steps 124 is small (e.g., 0.1 mm), the sidewall 114 of the tolerance ring 106 may not significantly deform to the extent as illustrated.

In an embodiment, the inner component 104 can extend into the outer component 102 a distance, D, as measured in a direction parallel with the central axis 118. In a particular embodiment, the distance, D, can extend between opposite axial ends of the outer component 102. During installation of the inner component 104 into the outer component 102, radial contact between the tolerance ring 106 and both of the inner and outer components 104 and 102 can occur along an axial distance, $D_{RC}$. As used herein "radial contact" refers to contact between the tolerance ring 106 and both the inner and outer components 104 and 102 which causes radial compression of at least two radially extending projections 116 to a final compressed state, e.g., a maximum compressed state. In an embodiment, because the stepped sidewalls 110 and 112 define progressively smaller diameters, e.g., the steps 124 each have a progressively smaller diameter than a previous step 124, radial contact may occur only after the inner component 104 axially translates such that a lowermost edge of the inner component 104 comes into contact with an uppermost edge of the lowermost step 124. As used herein, "uppermost" and "lowermost" refer to the orientation as illustrated in FIG. 3.

In an embodiment, $D_{RC}$ can be no greater than 0.95 D, such as no greater than 0.9 D, no greater than 0.85 D, no greater that 0.8 D, no greater than 0.75 D, no greater than 0.7

D, no greater than 0.65 D, no greater than 0.6 D, or even no greater than 0.55 D. In another embodiment, $D_{RC}$ can be at least 0.05 D, such as at least 0.1 D, at least 0.15 D, at least 0.2 D, at least 0.25 D, at least 0.3 D, at least 0.35 D, at least 0.4 D, at least 0.45 D, or even at least 0.5 D.

In an embodiment, the total work necessary to assemble the inner component 104 into the outer component 106 can be less than the work necessary to assemble a similar assembly having non-stepped sidewalls. For example, formation of the assembly 200 can require performance of a work, $W_{SS}$. Because radial contact occurs along $D_{RC}$- and $D_{RC}$ is less than D, and because radial contact increases frictional and radial resistance, $W_{SS}$ may be less than the work, $W_{NSS}$, necessary to assembly a similar assembly having a non-stepped sidewall. In such a manner, the total assembly force can be reduced. In an embodiment, this may reduce particle generation, reduce torque ripple and distortion, reduce eccentric positioning of the inner component, and reduce assembly time.

In a further embodiment, $W_{SS}$ can be less than 0.95 $W_{NSS}$, such as less than 0.9 $W_{NSS}$, less than 0.85 $W_{NSS}$, less than 0.8 $W_{NSS}$, less than 0.75 $W_{NSS}$, less than 0.7 $W_{NSS}$, less than 0.65 $W_{NSS}$, less than 0.6 $W_{NSS}$, less than 0.55 $W_{NSS}$, or even less than 0.5 $W_{NSS}$.

Figure 5:
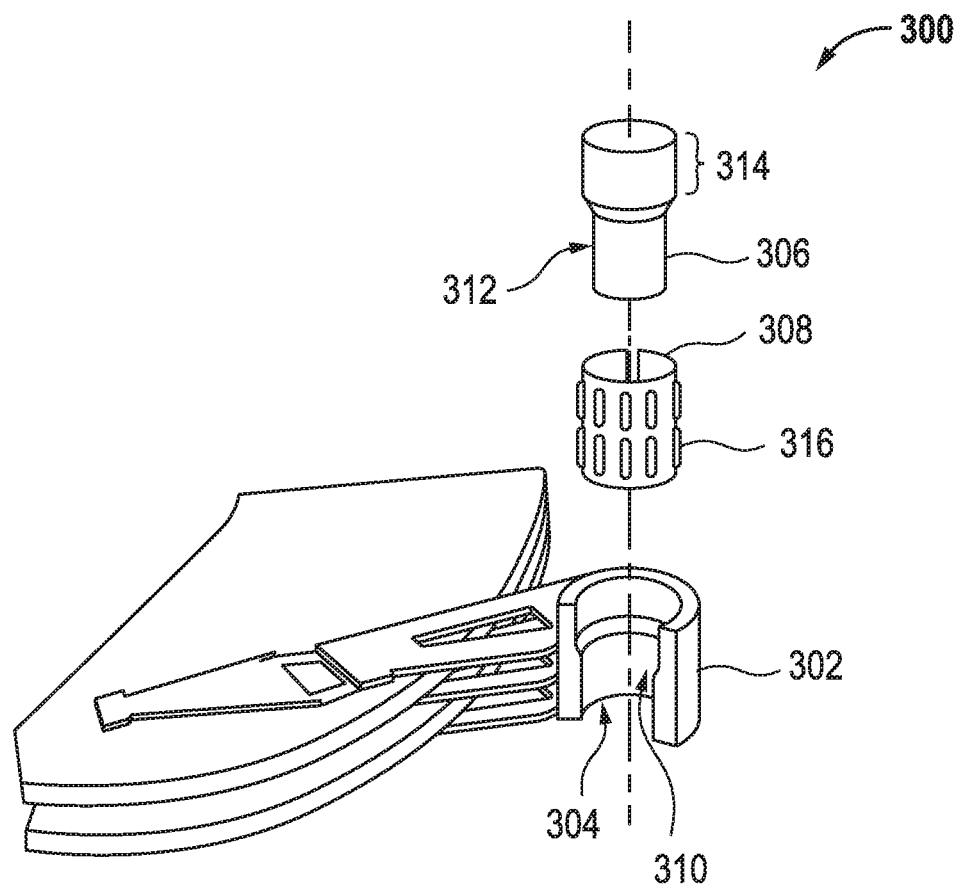
FIG. 5 includes a partially cutout, exploded perspective view of a hard disk drive in accordance with an embodiment.

FIG. 5 includes a partially cutout, exploded view of a hard disk drive assembly 300. In an embodiment, the hard disk drive assembly 300 can generally include an actuator arm 302 defining a bore 304, a pivot 306, and a tolerance ring 308 disposed between the pivot 306 and the bore 304. The bore 304 includes a stepped inner sidewall 310. The pivot 306 has a stepped outer sidewall 312. It can be appreciated that the stepped sidewalls 310 and 312 can have at least 2 steps 314, such as at least 3 steps 314, at least 4 steps 314, or even at least 5 steps 314. In an embodiment, the tolerance ring 308 can have an equal number of circumferential rows of radially extending projections 316. Moreover, the bore, pivot, and tolerance ring 304, 306, and 308 can have any number of features as described above with respect to the inner component, the outer component, and the tolerance ring 104, 102, and 106.

Many different aspects and embodiments are possible. Some of those aspects and embodiments are described below. After reading this specification, skilled artisans will appreciate that those aspects and embodiments are illustrative and do not limit the scope of the present invention. Embodiments may be in accordance with any one or more of the items as listed below.

Item 1. A preassembly comprising:
an outer component defining a bore having a stepped inner sidewall;
an inner component having a stepped outer sidewall; and
a tolerance ring adapted to be disposed between the inner component and the bore.

Item 2. An assembly comprising:
an outer component defining a bore having a stepped inner sidewall;
an inner component having a stepped outer sidewall; and
a tolerance ring disposed between the inner component and the bore.

Item 3. The preassembly or assembly according to any one of the preceding items, wherein the assembly comprises a hard disk drive assembly.

Item 4. The preassembly or assembly according to any one of the preceding items, wherein the outer component comprises an actuator arm, and wherein the inner component comprises a pivot.

Item 5. A hard disk drive preassembly comprising:
an actuator arm defining a bore having a stepped inner sidewall;
a pivot having a stepped outer sidewall; and
a tolerance ring adapted to be disposed between the pivot and the bore.

Item 6. A method of assembling a hard disk drive comprising:
providing an actuator arm having a bore with a stepped inner sidewall;
providing a pivot having a stepped outer sidewall;
providing a tolerance ring;
engaging a first radial side of the tolerance ring with the sidewall of one of the bore and pivot;
engaging the other one of the bore and pivot with a second radial side of the tolerance ring.

Item 7. The method according to item 6, wherein engaging the first radial side of the tolerance ring is performed such that the first radial side is engaged with the bore.

Item 8. The preassembly, hard disk drive preassembly, assembly, or method according to any one of the preceding items, wherein the tolerance ring further comprises a circumferential gap extending at least partially between opposite axial ends of the tolerance ring.

Item 9. The preassembly, hard disk drive preassembly, assembly, or method according to item 8, wherein the circumferential gap extends entirely between opposite axial ends of the tolerance ring.

Item 10. The preassembly, hard disk drive preassembly, assembly, or method according to any one of items 8 and 9, wherein the circumferential gap has a first width, $W_{G1}$, as measured at a first axial end of the tolerance ring and a second width, $W_{G2}$, as measured at a second axial end of the tolerance ring, and wherein $W_{G1}$ is different than $W_{G2}$.

Item 11. The preassembly, hard disk drive preassembly, assembly, or method according to item 10, wherein $W_{G1}$ is no greater than 1.5 $W_{G2}$, such as no greater than 1.4 $W_{G2}$, no greater than 1.3 $W_{G2}$, no greater than 1.2 $W_{G2}$, no greater than 1.1 $W_{G2}$, no greater than 1.05 $W_{G2}$, or even no greater than 1.01 $W_{G2}$.

Item 12. The preassembly, hard disk drive preassembly, assembly, or method according to any one of items 10 and 11, wherein $W_{G1}$ is at least 1.0001 $W_{G2}$, such as at least 1.0002 $W_{G2}$, at least 1.001 $W_{G2}$, or even at least 1.005 $W_{G2}$.

Item 13. The preassembly, hard disk drive preassembly, assembly, or method according to any one of the preceding items, wherein the tolerance ring comprises an annular sidewall having a plurality of radially extending projections.

Item 14. The preassembly, hard disk drive preassembly, assembly, or method according to item 13, wherein the radially extending projections are deformable in a radial direction.

Item 15. The preassembly, hard disk drive preassembly, assembly, or method according to any one of items 13 and 14, wherein the radially extending projections are adapted to operate in an elastic zone of deformation.

Item 16. The preassembly, hard disk drive preassembly, assembly, or method according to any one of items 13-15, wherein at least some of the radially extending projections extend radially inward.

Item 17. The preassembly, hard disk drive preassembly, assembly, or method according to any one of items 13-15, wherein all of the radially extending projections extend radially inward.

Item 18. The preassembly, hard disk drive preassembly, assembly, or method according to any one of items 13-16, wherein at least some of the radially extending projections extend radially outward.

Item 19. The preassembly, hard disk drive preassembly, assembly, or method according to any one of items 13, 14, and 18, wherein all of the radially extending projections extend radially outward.

Item 20. The preassembly, hard disk drive preassembly, assembly, or method according to any one of the preceding items, wherein the tolerance ring further comprises an undeformed band extending around at least one axial end of the tolerance ring.

Item 21. The preassembly, hard disk drive preassembly, assembly, or method according to any one of the preceding items, wherein the stepped inner sidewall has a number of steps, wherein the stepped outer sidewall has a number of steps, and wherein the number of steps of the stepped inner sidewall is equal to the number of steps of the outer sidewall.

Item 22. The preassembly, hard disk drive preassembly, assembly, or method according to any one of the preceding items, wherein a number of steps in the stepped sidewalls is equal to a number of circumferentially extending rows of radially extending projections in the tolerance ring.

Item 23. The preassembly, hard disk drive preassembly, assembly, or method according to any one of items 13-22, wherein the radially extending projections form at least two circumferentially extending rows along the annular band of the tolerance ring.

Item 24. The method, hard disk drive, preassembly, or assembly according to any one of items 13-23, wherein a perceived radial stiffness of a first row of radially extending projections is equal to a perceived radial stiffness of a second row of radially extending projections.

Item 25. The preassembly, hard disk drive preassembly, assembly, or method according to any one of the preceding items, wherein the stepped inner sidewall has at least 2 steps, such as at least 3 steps, at least 4 steps, at least 5 steps, or even at least 10 steps.

Item 26. The preassembly, hard disk drive preassembly, assembly, or method according to any one of the preceding items, wherein the stepped inner sidewall of the actuator arm has no greater than 20 steps, such as no greater than 15 steps, or even no greater than 11 steps.

Item 27. The preassembly, hard disk drive preassembly, assembly, or method according to any one of the preceding items, wherein each step of the inner sidewall defines a diameter, and wherein the diameter of each step is different.

Item 28. The preassembly, hard disk drive preassembly, assembly, or method according to any one of items 25-27, wherein a diameter of adjacent steps increases from a first axial end of the pivot or inner component to a second axial end of the pivot or inner component.

Item 29. The preassembly, hard disk drive preassembly, assembly, or method according to any one of the preceding items, wherein each step has a diameter, and wherein the diameter of adjacent steps differs by no greater than 10%, such as no greater than 8%, no greater than 5%, or even no greater than 1%.

Item 30. The preassembly, hard disk drive preassembly, assembly, or method according to any one of the preceding items, wherein each step has a diameter, and wherein the diameter of adjacent steps differs by no greater than 10 mm, such as no greater than 1 mm, no greater than 0.5 mm, or even no greater than 0.2 mm.

Item 31. The preassembly, hard disk drive preassembly, assembly, or method according to any one of the preceding items, wherein each step has a diameter, and wherein the diameter of adjacent steps differs by at least 0.05 mm, such as at least 0.1 mm, or even at least 0.15 mm.

Item 32. The preassembly, hard disk drive preassembly, assembly, or method according to any one of the preceding items, wherein each step of the stepped inner and outer sidewalls comprises a cylindrical surface.

Item 33. The preassembly, hard disk drive preassembly, assembly, or method according to any one of the preceding items, wherein, as viewed in cross section, at least two of the step are oriented along parallel lines.

Item 34. The preassembly, hard disk drive preassembly, assembly, or method according to any one of the preceding items, wherein, when viewed in cross section, all of the steps are oriented along parallel lines.

Item 35. The preassembly, hard disk drive preassembly, assembly, or method according to any one of the preceding items, wherein the inner component or pivot is adapted to extend into the outer component or bore a distance, D, wherein radial contact between the tolerance ring and both the bore or outer component and the pivot or inner component is adapted to occur along an axial distance, $D_{RC}$, and wherein $D_{RC}$ is less than D.

Item 36. The preassembly, hard disk drive preassembly, assembly, or method according to item 35, wherein $D_{RC}$ is less than 0.90 D, such as less than 0.75 D, or even less than 0.55 D.

Item 37. The preassembly, hard disk drive preassembly, assembly, or method according to any one of the preceding items, wherein assembly of the hard disk drive, preassembly, or assembly requires performance of a work, $W_{SS}$, wherein assembly of a hard disk drive, preassembly, or assembly having a non-stepped sidewall requires performance of a work, $W_{NSS}$, and wherein $W_{SS}$ is less than 0.95 $W_{NSS}$, such as less than 0.85 $W_{NSS}$, less than 0.75 $W_{NSS}$, less than 0.65 $W_{NSS}$, or even less than 0.5 $W_{NSS}$.

Item 38. A preassembly comprising:
an outer component defining a bore;
an inner component; and
a tolerance ring adapted to be disposed between the inner component and the bore, the tolerance ring including an annular sidewall and at least two circumferential rows of radially extending projections, each row of radially extending projections defining a maximum projecting distance as measured from a central axis of the tolerance ring,
wherein one of the inner and outer components has a stepped sidewall with a greatest diameter at a first axial end, and wherein each successive row of radially extending projections, as measured from a first axial end of the tolerance ring to a second axial end of the tolerance ring, has a maximum projecting distance less than the previous row.

Item 39. The preassembly according to item 38, wherein the inner component has a stepped outer sidewall.

Item 40. The preassembly according to item 39, wherein the radially extending projections extend radially inward.

Item 41. The preassembly according to any one of items 38-40, wherein the outer component has a stepped sidewall.

Item 42. The preassembly according to item 41, wherein the radially extending projections extend radially outward.

Item 43. The preassembly, hard disk drive preassembly, assembly, or method according to any one of the preceding items, wherein the inner component or pivot is rigid.

Item 44. The preassembly, hard disk drive preassembly, assembly, or method according to any one of the preceding items, wherein the stepped outer sidewall of the inner component or pivot is adapted to be significantly undeformed during assembly.

Item 45. The preassembly, hard disk drive preassembly, assembly, or method according to any one of the preceding items, wherein the outer component or actuator arm is rigid.

Item 46. The preassembly, hard disk drive preassembly, assembly, or method according to any one of the preceding items, wherein the stepped inner sidewall of the outer component or actuator arm is adapted to be significantly undeformed during assembly.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A preassembly comprising:
   an outer component comprising an actuator arm defining a bore having a stepped inner sidewall comprising a plurality of steps, each pair of adjacent steps having a transition zone disposed therebetween, wherein a diameter of adjacent steps of the stepped inner sidewall increases from a first axial end of the outer component to a second axial end thereof;
   an inner component comprising a pivot shaft having a stepped outer sidewall comprising a plurality of steps, each pair of adjacent steps having a transition zone disposed therebetween, wherein a diameter of adjacent steps of the stepped outer sidewall increases from a first axial end of the inner component to a second axial end thereof; and
   a tolerance ring comprising an annular sidewall and a plurality of circumferentially extending rows of radially outward extending projections extending from the annular sidewall, wherein the tolerance ring is adapted to be disposed between the inner component and the bore, and wherein a number of steps in the stepped inner and outer sidewalls is equal to a number of rows of projections of the tolerance ring;
   wherein the tolerance ring is axially inserted into the bore and the inner component is axially inserted into the tolerance ring such that each step of the inner component axially aligns with a corresponding step of the outer component and radially deforms the sidewall of the tolerance ring to form a corresponding stepped configuration such that each row of projections contacts a corresponding step of the outer component and a radially inner surface of the tolerance ring contacts the corresponding step of the inner component.

2. The preassembly according to claim 1, wherein the tolerance ring further comprises:
   a circumferential gap extending at least partially between opposite axial ends of the tolerance ring, the circumferential gap having a first width, $W_{G1}$, as measured at a first axial end of the tolerance ring, and a second width, $W_{G2}$, as measured at a second axial end of the tolerance ring, wherein $W_{G1}$ is different than $W_{G2}$.

3. The preassembly according to claim 1, wherein a perceived radial stiffness of a first row of radially extending projections is equal to a perceived radial stiffness of a second row of radially extending projections.

4. The preassembly according to claim 1, wherein the inner component is adapted to extend into the outer component a distance, D, wherein radial contact between the tolerance ring and both the outer component and the inner component is adapted to occur along an axial distance, $D_{RC}$, and wherein $D_{RC}$ is less than D.

5. The preassembly according to claim 1, wherein the inner and outer components comprise a material adapted to be significantly undeformed during assembly with the tolerance ring.

6. A method of assembling a hard disk drive comprising:
   providing an actuator arm having a bore with a stepped inner sidewall comprising a plurality of steps, each pair of adjacent steps having a transition zone disposed therebetween, wherein a diameter of adjacent steps of the stepped inner sidewall increases from a first axial end of the outer component to a second axial end thereof;
   providing a pivot shaft having a stepped outer sidewall comprising a plurality of steps, each pair of adjacent steps having a transition zone disposed therebetween, wherein a diameter of adjacent steps of the stepped outer sidewall increases from a first axial end of the inner component to a second axial end thereof;
   providing a tolerance ring comprising an annular sidewall and a plurality of circumferentially extending rows of radially outward extending projections extending from the annular sidewall, wherein a number of steps in the stepped inner and outer sidewalls is equal to a number of rows of projections of the tolerance ring;
   engaging a first radial side of the tolerance ring with the sidewall of the bore; and
   engaging the pivot shaft with a second radial side of the tolerance ring;
   wherein the tolerance ring is axially inserted into the bore and the inner component is axially inserted into the tolerance ring such that each step of the inner component axially aligns with a corresponding step of the outer component and radially deforms the sidewall of the tolerance ring to form a corresponding stepped configuration such that each row of projections contacts a corresponding step of the outer component and a radially inner surface of the tolerance ring contacts the corresponding step of the inner component.

7. The method according to claim 6, wherein the tolerance ring comprises a circumferential gap extending at least partially between opposite axial ends of the tolerance ring, wherein the circumferential gap has a first width, $W_{G1}$, as measured at a first axial end of the tolerance ring, and a second width, $W_{G2}$, as measured at a second axial end of the tolerance ring, and wherein $W_{G1}$ is different than $W_{G2}$.

8. The method according to claim 6, wherein assembly of the hard disk drive requires performance of a work, $W_{SS}$, wherein assembly of a hard disk drive having a non-stepped sidewall requires performance of a work, $W_{NSS}$, and wherein $W_{SS}$ is less than $0.95\ W_{NSS}$.

9. The method according to claim 1, wherein the transition zone, when viewed in cross section, comprises an at least a partially arcuate profile.

\* \* \* \* \*